United States Patent
Zhang et al.

(10) Patent No.: US 7,518,994 B2
(45) Date of Patent: Apr. 14, 2009

(54) SYSTEM AND METHOD OF HANDLING IP LAYER MOBILITY IN A WIRELESS NETWORK

(75) Inventors: Haining Zhang, Kanata (CA); Risvan Coskun, Ottawa (CA)

(73) Assignee: Research in Motion Limited, Waterloo (CA)

( * ) Notice: Subject to any disclaimer, the term of this patent is extended or adjusted under 35 U.S.C. 154(b) by 484 days.

(21) Appl. No.: 10/962,057

(22) Filed: Oct. 8, 2004

(65) Prior Publication Data
US 2005/0078636 A1    Apr. 14, 2005

Related U.S. Application Data

(60) Provisional application No. 60/509,518, filed on Oct. 8, 2003.

(51) Int. Cl.
*H04J 1/16* (2006.01)
(52) U.S. Cl. .................. 370/235; 370/331; 370/412; 455/436; 455/414.2
(58) Field of Classification Search .............. 370/331, 370/235, 231, 235.1, 237, 236, 229, 338, 370/401, 328, 329, 332, 351, 352, 355, 356, 370/362, 378, 395, 53, 463, 465, 466, 354, 370/412–413, 415, 417, 420; 455/424, 425, 455/456.5, 456.6, 561, 552.1, 550.1, 575.1, 455/412.1, 413, 414.1, 436, 432.1, 442, 445, 455/452.1, 446, 414.2, 525, 556.1, 554.1, 455/554.2, 556.2, 185.1, 440; 709/200, 201, 709/202, 213, 245, 246, 248, 249, 228
See application file for complete search history.

(56) References Cited

U.S. PATENT DOCUMENTS

| | | | | |
|---|---|---|---|---|
| 6,385,451 B1 * | 5/2002 | Kalliokulju et al. | .......... | 455/437 |
| 6,407,988 B1 * | 6/2002 | Agraharam et al. | .......... | 370/328 |
| 6,484,211 B2 * | 11/2002 | Turunen | .................... | 709/245 |
| 6,553,015 B1 * | 4/2003 | Sato | .......................... | 370/331 |
| 6,608,832 B2 * | 8/2003 | Forslow | ...................... | 370/353 |
| 6,711,147 B1 * | 3/2004 | Barnes et al. | ................ | 370/338 |
| 6,799,039 B2 * | 9/2004 | Wu et al. | .................... | 455/436 |
| 6,826,154 B2 * | 11/2004 | Subbiah et al. | ............. | 370/236 |
| 6,904,025 B1 * | 6/2005 | Madour et al. | .............. | 370/328 |
| 7,075,908 B2 * | 7/2006 | Noguchi et al. | ............. | 370/329 |
| 7,088,685 B2 * | 8/2006 | Meyerson et al. | ........... | 370/260 |
| 7,184,765 B1 * | 2/2007 | Birnie et al. | ............. | 455/432.3 |
| 2003/0137947 A1 * | 7/2003 | Roy et al. | ................... | 370/310 |

(Continued)

FOREIGN PATENT DOCUMENTS

EP    0851633 A2 *    7/1998

*Primary Examiner*—Duc Nguyen
*Assistant Examiner*—Charles Chow (57) ABSTRACT

A system and method for facilitating the efficient operation of a mobile station as it transfers from communicating via one wireless data network to another. A session control node is coupled to the mobile node in such a manner that it selectively buffers data being transmitted to the mobile node, at least while the network transfer is being executed. When the mobile node had dropped its communication session with a first wireless network and established a new communication session with a second wireless network, the buffered data is read out and transmitted to the mobile node. The session control node may be coupled with a home network associated with the mobile node or a control node may be associated with the mobile node on an ad hoc basis.

20 Claims, 6 Drawing Sheets

U.S. PATENT DOCUMENTS

| | | | |
|---|---|---|---|
| 2004/0090937 A1* | 5/2004 | Chaskar et al. | 370/331 |
| 2004/0131040 A1* | 7/2004 | Grujl et al. | 370/349 |
| 2004/0174853 A1* | 9/2004 | Saito et al. | 370/338 |
| 2005/0111410 A1* | 5/2005 | Bazar | 370/331 |
| 2005/0207395 A1* | 9/2005 | Mohammed | 370/352 |
| 2006/0205407 A1* | 9/2006 | Jagadeesan et al. | 455/436 |
| 2006/0227755 A1* | 10/2006 | Wada et al. | 370/338 |
| 2006/0291455 A1* | 12/2006 | Katz et al. | 370/355 |
| 2007/0091845 A1* | 4/2007 | Brideglall | 370/331 |

* cited by examiner

SYSTEM AND METHOD OF HANDLING IP LAYER MOBILITY IN A WIRELESS NETWORK

The present invention claims the priority of U.S. Provisional Patent Application No. 60/509,518, filed Oct. 8, 2003, the contents of which are incorporated herein by reference.

FIELD OF THE INVENTION

The present invention relates generally to wireless mobile networks. More particularly, the present invention relates to a system, and an associated method, by which to facilitate the efficient operation of a mobile station while it is transferring between one wireless mobile network and another, while minimizing data loss and inconvenience to the user.

BACKGROUND OF THE INVENTION

Communication at a distance can take many forms, from primitive signal fires to advanced telecommunications. The modem telecommunications era began with the discovery that sounds such as those produced by the human voice could be converted into electrical signals transmissible by wire to far distant locales. This is of limited usefulness, of course, if there are only two telephones connected by a single wire—each phone can only communicate with the other. To allow widespread use of telephone technology, vast switching networks evolved so that virtually any telephone user could be connected with any other, so long as they both had access to the networks. A telecommunications network is not simply a conglomeration of multiple pairs of phones connected to each other. Rather, each phone is connected to a switch, that can complete a connections to many other telephones or other switches similarly capable. The circuit for any one phone call may pass through any number of these switches in order to ultimately connect the parties that wish to communicate with each other. Many such networks exist, but generally speaking they are able to communicate with each other to route calls between subscribers of different networks.

Computers may also be connected to communication networks, although often for data rather than voice communication. Computers were originally large, isolated pieces of equipment that in themselves represented a great advance in technology. Able to perform certain computations very much faster than human calculators, they enabled very complex problems to be solved in less time than had before been possible. At first, computers did not typically communicate with each other, but as both computing and communication technology advanced, the advantages of doing so became apparent. Computers that can communicate with each other can share data and computing resources, and can process the results into human-perceivable form at multiple locations almost simultaneously. Data input need only be done once if computers can share data files. Thus data communications enable not only the machines, but also the humans operating them to work together more efficiently.

Data sent from one computer to another may be used for a variety of applications. One very popular application that has evolved, for example, is email, where users send text messages to each other. Each user in a computer network can be assigned a network address so that email sent by one user can be targeted to one, or to many others who are connected to the network.

Computer networks were originally deployed within a relatively-closed environment such as in an office or university setting. These networks are sometimes referred to as local area networks, or LANs. Network users, of course, could only communicate with others on the same network. Networks were eventually interconnected, however, so that users of one network could communicate with users of another. Eventually, a standard protocol for communication and the necessary physical connections were employed to connect a large number of networks to each other, creating the world-wide communication system referred to as the Internet.

The Internet enables almost any computer to be connected to any another. Not unexpectedly, this connectivity has found many uses. As the capacity of individual computing devices and communication networks increased, users could send not only email and text files, but large data files for producing at the received device graphic and even animated images for display and sound files to produce an audio presentation. The introduction of the World Wide Web (WWW) provided a way for individual users to access data such as these stored on remote servers coupled to the Internet, and to request that certain files be sent to them for presentation. More recently, multimedia presentations involving audio and video presented in real time may also be sent.

In either case, voice or data communication, wireless channels have become a popular alternative to wireline connections. Wireless, and especially radio frequency communication have been in use for some time. But it is only relatively recently that advances in technology have enabled its widespread use. Radio frequency communications tend to interfere with each other unless some steps are taken to create separate channels. The first such advance, of course, was to use different, spaced apart frequencies to create different. A receiver tuned to a particular one of these frequencies in order to distinguish the communications intended for it from others. Radio telephone communication networks became feasible with the introduction of cellular architecture. In this scheme, radio antennas and base stations are deployed at relatively close physical locations across a network coverage area, and each is connected to a switching network similar to that of a conventional wireline system. Individual telephones, however, use radio channels to communicate with a nearby base station in order to connect with the network. Each antenna defines a cell, and its relatively-small size means that the individual communications taking place within it can use low transmission power. These communications therefore tend not to interfere with communications in non-adjacent cells, which can therefore reuse the same radio frequencies for their communications.

The low-power transmission requirements also contributed to the ability to make smaller telephones, making them more convenient and hence more popular. A chief advantage of wireless communication, of course, is mobility. Subscribers to a cellular network may use their phones from almost anywhere in the network coverage area. Calls to network subscribers are handled by the network itself, while gateways to other networks, including traditional telephone networks, can be used to connect to others. As the usage of cell phones increased, other methods of increasing network capacity were developed, including dividing individual frequencies into time slots allocated to individual conversations on a periodic basic in such a manner than many conversations can share the same frequency with little or no user-perceivable interruption.

Computers now also use wireless communication, though the demands of data communication are often somewhat different than those of voice communication. Telephone conversations are "real-time", meaning that it is important that the information carried on the radio channel arrive very soon after it is transmitted. Large delays or interruptions are intolerable. The human ear, however, is capable of understanding a conversation even if it is not reproduced exactly as it would be heard if the parties were in the same room. Minor variations in quality present little difficulty. Received data communications, on the other hand, must often be reproduced very faithfully in order to be useful. Data, however, can often be broken down into small packets for separate transmission. These packets can be sent in any order and reassembled at the receiver. Error checking algorithms are employed so that re-transmission of improperly received data can be requested. Not all data transmissions, however, enjoy this distinction. Wireless data communication network are now being challenged by real time applications such as streaming multimedia presentation and voice conversations that are converted into and transmitted as data communications.

Figure 1:
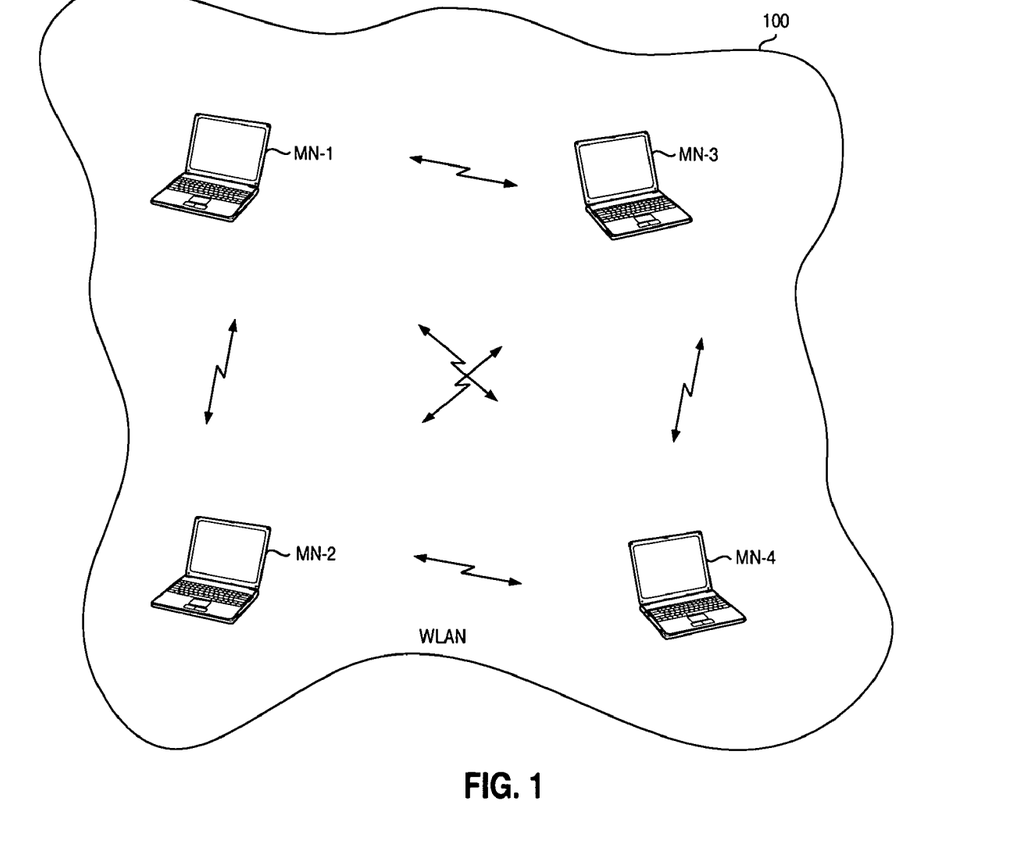
FIG. 1 is a functional block diagram illustrating a typical basic service set (BSS).

Some wireless computer networks can be created for local use by a number of devices with radio communication range of each other. In a wireless LAN (WLAN), users can transmit data in various forms to each other using a standard protocol such as that prescribed in a specification designated as IEEE 802.11b. This and similar protocols are simply agree-upon standards for wireless communication. Although the development of such standard protocols is sometimes a painstaking process, their application permits widespread communication by a wide variety of devices made by different manufacturers. FIG. 1 is a functional block diagram illustrating a typical basic service set (BSS) 100. A BSS, one type of WLAN, is often an ad hoc network, that is, one that arises when needed by the particular users involved. The different devices in the WLAN, often referred to as nodes, can and typically do vary from time to time. In the BSS 100 of FIG. 1, mobile nodes MN-1 through MN-4 have established a WLAN for communicating with each other. They generally do not communicate at the same time, but take turns according to rules set out in the particular protocol they are using. They can, for example, send email or other data files to each other. Their communication is limited, however, to other nodes in the BSS 100. The number of nodes that can join the network is limited, and they can typically only communicate with each other within a limited geographic area.

Figure 2:
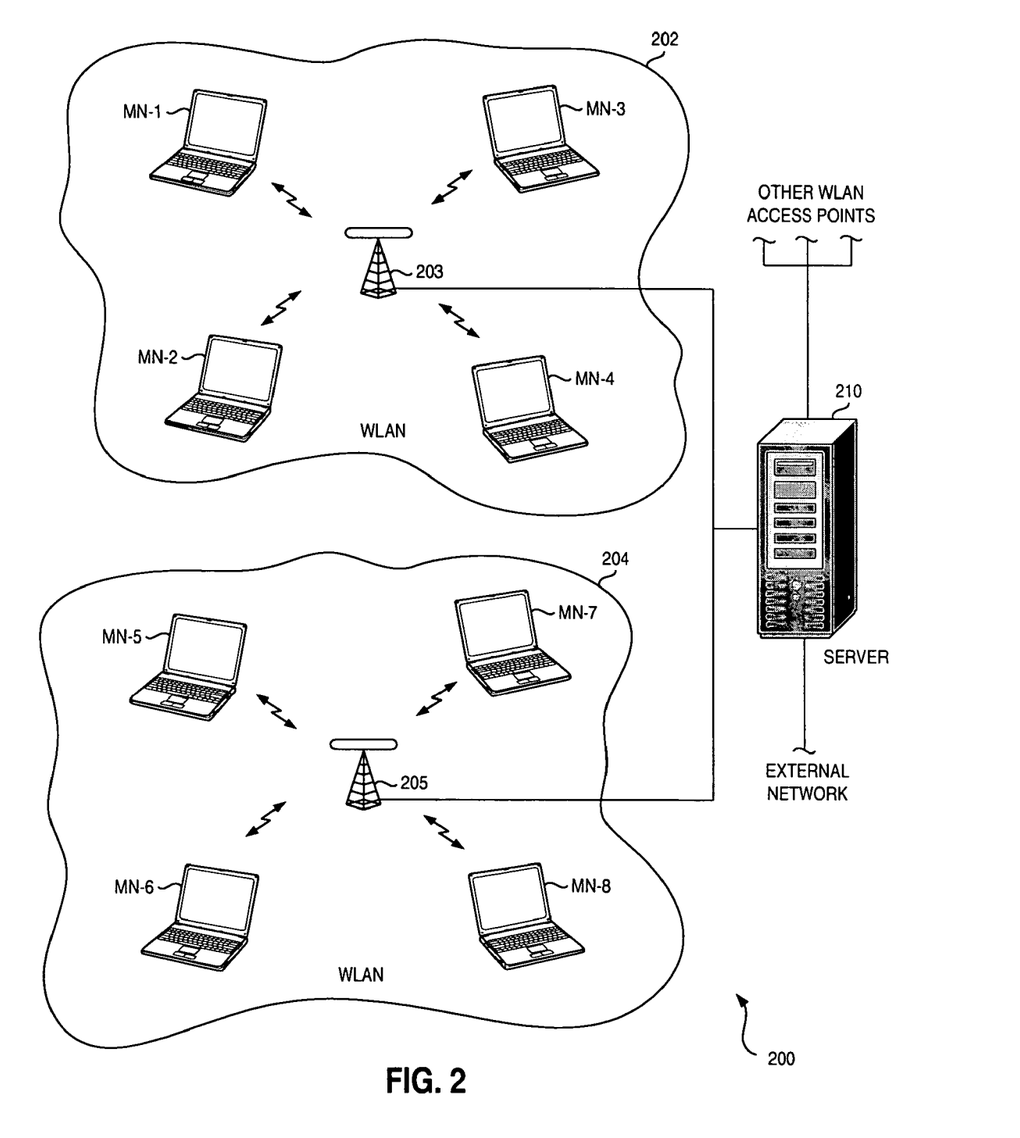
FIG. 2 is a functional block diagram illustrating a typical extended service set (ESS).

To expand the capacity and coverage area, and different form of WLAN is often employed. An infrastructure BSS (If-BSS), for example, is often used. In an If-BSS, an access point (AP) is provided such that the individual nodes each communicate via the AP, which is often a device dedicated to this purpose. The AP may regulate communications between the individual nodes, and may be a conduit for connecting to a larger network, as illustrated in FIG. 2. FIG. 2 is a functional block diagram illustrating a typical extended service set (ESS) 200. In this illustration, two separate WLANS, here If-BSS 202 and IF-BSS 204 are connected to a central server 210. Mobile nodes MN-1 through MN-4 communicate through AP 203 of If-BSS 202, and mobile nodes MN-5 through MN-8 communicate via AP 205 of IF-BSS 204. Server 210 may, of course, be connected to other wireless (or wired) networks as well. Note that the lines representing the coverage area of each individual LAN are for illustration, coverage areas may overlap, and nodes are not necessarily assigned to the nearest AP.

As should be apparent, the ESS 200 of FIG. 2 permits a greater number of users spread over a larger area to communicate data with each other. In addition, server 210 may be connected to an external network, such as the Internet, to facilitate even more universal communication accessibility. Within ESS 200, users (or more properly, nodes) are assigned an address so that communications between them can be routed throughout the network. Communication between the nodes of an If-BSS can simply be routed through its AP, while communications with nodes associated with other If-BSSs can be routed through the central server 210. Nodes may move from one area to another, of course, and provision is generally made so that they may change from using one AP for communication to using another.

Some cellular telephone networks, such as those referred to as third-generation (3G) networks, are capable of communicating data in addition to standard voice conversation. Server 210 may also permit connection to such networks, permitting data communications between their respective users. Many devices, in fact, are now capable of communicating in both the WLAN and the 3G environment, meaning that for data (and in some cases voice) communication they may utilize whichever network is most desirable. Mobile nodes capable of transferring from one network to another may also do so while data is being transferred.

Unfortunately, an on-going communication session is dropped when a user roams from one WLAN subnet to another, or from one WLAN network to another, or from a WLAN network to a 3G network, or from a WLAN network to another type of wireless data network. This is a major problem for time-sensitive real-time applications like voice over IP, stream video, and critical data application that require a consistent connection. The roaming may even cause the terminal to become unreachable as a result of the address change. Even where the user is presented with an option to transfer from one network to another, they may be unaware of the effect this transfer will have on ongoing data communications.

Needed, therefore, is a manner of allowing nodes that roam from one network to another to more efficiently transfer while minimizing this data loss or corruption. The present invention provides just such a solution.

SUMMARY OF THE INVENTION

The present invention, accordingly, advantageously provides a system, and an associated method, by which to facilitate the transfer of a mobile node between a first network and a second network in a multi-network wireless communication system.

In one aspect, the present invention is a method including the steps of said method comprising the steps of determining that a network transfer is desirable, buffering, in a session control node, any data that is being transmitted to the mobile node, terminating communication of the mobile node with the first network, establishing communication of the mobile node to the second network, and transmitting the data buffered in the session control node to the mobile node.

In another aspect, the present invention is a system for use in transferring the communications of a mobile node operating in a multi-network communication network including a first wireless communication network through which the mobile node may receive information during a first communication session, a second wireless communication network through which the mobile node may receive information during a second communication session, and a session control node operable to buffer the data, if any, that is being transmitted to the mobile node via the first communication network and to read out the buffered data and transmit it to the mobile node after it has terminated the first communication system and established the session communication session.

In yet another aspect, the present invention is a session control node for facilitating the transfer of communications by a mobile node from a first wireless network to a second wireless network, including a buffer for buffering data, if any, being transmitted to the mobile node via the first wireless network so that it can be transmitted to the mobile node following the transfer of communications.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

The present invention is directed to a method of facilitating wireless communications involving a mobile node as it travels from one wireless network to another, and to a system for effecting this method, and to a control node operating in such a system.

It is an object of the present invention to provide a wireless system operable to transfer communications between a mobile node and a content-originating server from one network to another in an efficient manner while minimizing data loss or interruption. The invention may be advantageously employed in the context of, for example, streaming multimedia presentations or intensive data transfers. Either of these exemplary applications may encounter difficulties when the mobile node switches networks because, in a typical system, the mobile node must tear down one communication session and rebuild another. The (temporary) network address, for example an IP address, that was being used to route data to the mobile node must be abandoned for a new one. However quickly this may be accomplished, a noticeable discontinuity is almost inevitable. (This noticeable discontinuity may involve a humanly-perceivable interruption in a multimedia presentation, or in the corruption of the data files being transferred.) Even where the data loss can be detected and remedied, the process of doing so introduces some unwanted inefficiency into the transmission process (and especially wastes valuable air interface resources). Solutions proposed previously involve providing the mobile node with a constant and universal address or ID instead of a temporary network address, but such solutions do not entirely address the basic problem.

Figure 3:
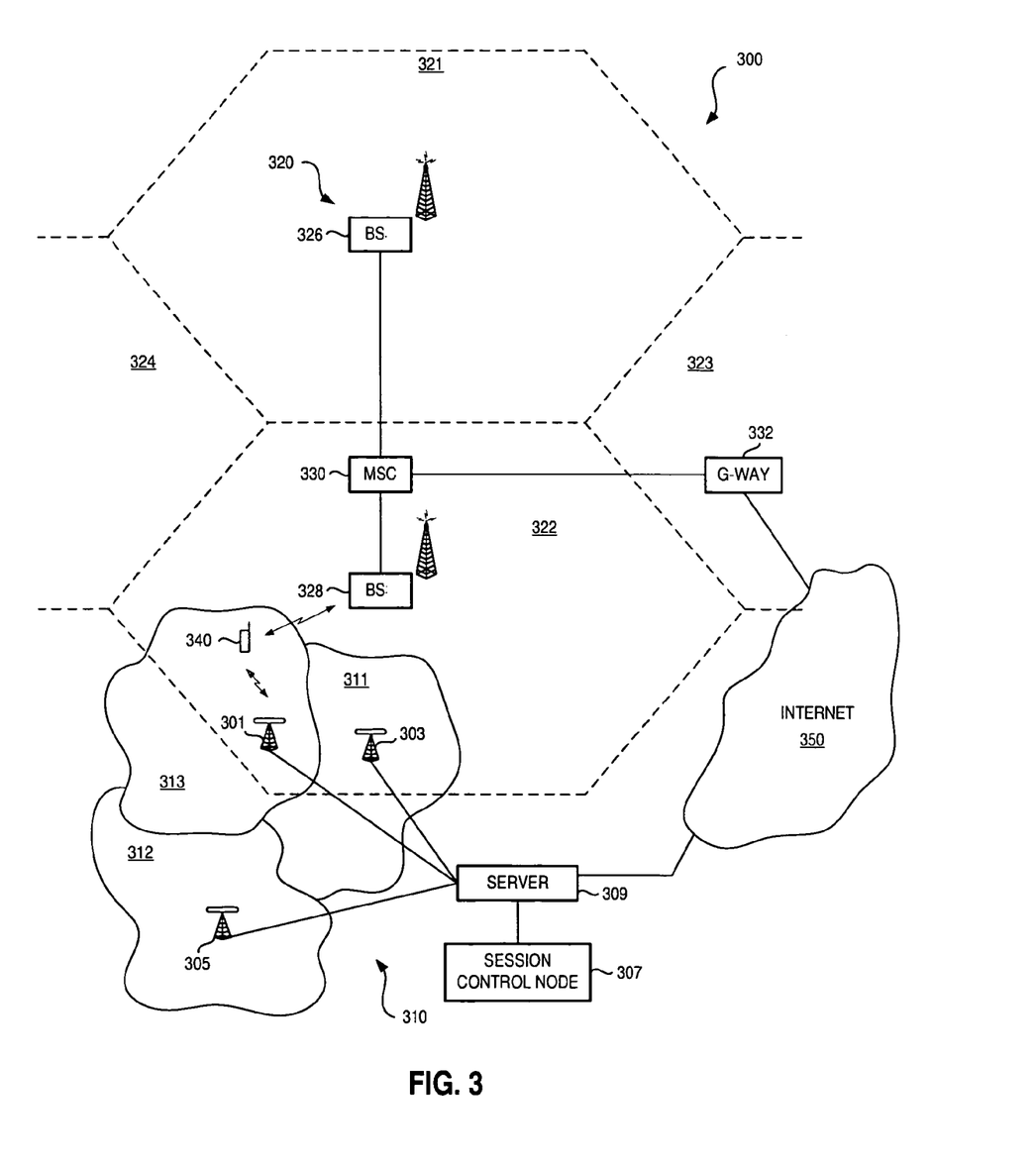
FIG. 3 is a functional block diagram illustrating several networks that may be selectively used by a mobile node according to an embodiment of the present invention.

FIG. 3 is a simplified functional block diagram illustrating a communication system 300 including several networks that may be selectively used by a mobile node according to an embodiment of the present invention. Note that the system of FIG. 3 is exemplary and not limiting, and other configurations are possible. System 300 includes a 3G cellular network 320 that can be used for standard voice communications, and for data communication as well. Several cells, enumerated 321 through 324, are delineated by broken lines. Each of these cells is occupied by an antenna and base station (BS), two of which are shown in FIG. 3. BS 326 is used for nodes communicating in cell 321, and BS 328 is used for cell 322. Each BS is connected to the cellular network infrastructure through a mobile switching center (MSC) 330. Note that a typical network will include a many such devices, with different MSCs being connected to each other and to higher-level switches. For simplicity, MSC 330 is shown connected only to gateway 332, which in turn connects 3G network 320 to the Internet 350 through which data communication may take place and, in this example, through which the various system networks may communicate.

WLAN 310 includes three sub-networks, here If-BSSs 311, 312, and 313, having access points 303, 305, and 301, respectively. For convenience, only a single mobile node 340 is shown. If-BSSs 311, 312, and 313 are connected to each other through server 309, which is also coupled to the Internet 350. WLAN 310 also includes session control node 307, operable to facilitate the transfer of mobile node 340 from one network to another according to an embodiment of the present invention, as described in more detail below. Note that in this embodiment session control node 307 is coupled with WLAN 310 at server 309, but other configurations are possible. Also, in this embodiment, WLAN 310 forms a home network for mobile node 340, which is permanently associated with session control node 307. In an alternate embodiment (not shown), mobile node 340 may form a temporary association with another session control node if it is desirable to do so.

Note also that the two networks 310 and 320 and the Internet 350 are only examples of the many networks that may be used by mobile node 340. These various networks are frequently not owned and operated by the same operator. While the transfer of mobile node 340 will be described in terms of its transfer from WLAN 310 to 3G network 320, the present invention is not limited to such transfers.

In the context of the present invention, a network transfer simply means that the mobile node communicating with a content-originating server is changing from communicating with the server via one communication network to communicating with the server via another communication network. Either of these two communications networks may be the mobile node's home network, but this is not a requirement of the invention unless explicitly stated. With that in mind, neither network need conform to any standard configuration, so long as communication between the mobile node and the originating server may be accomplished.

Figure 4:
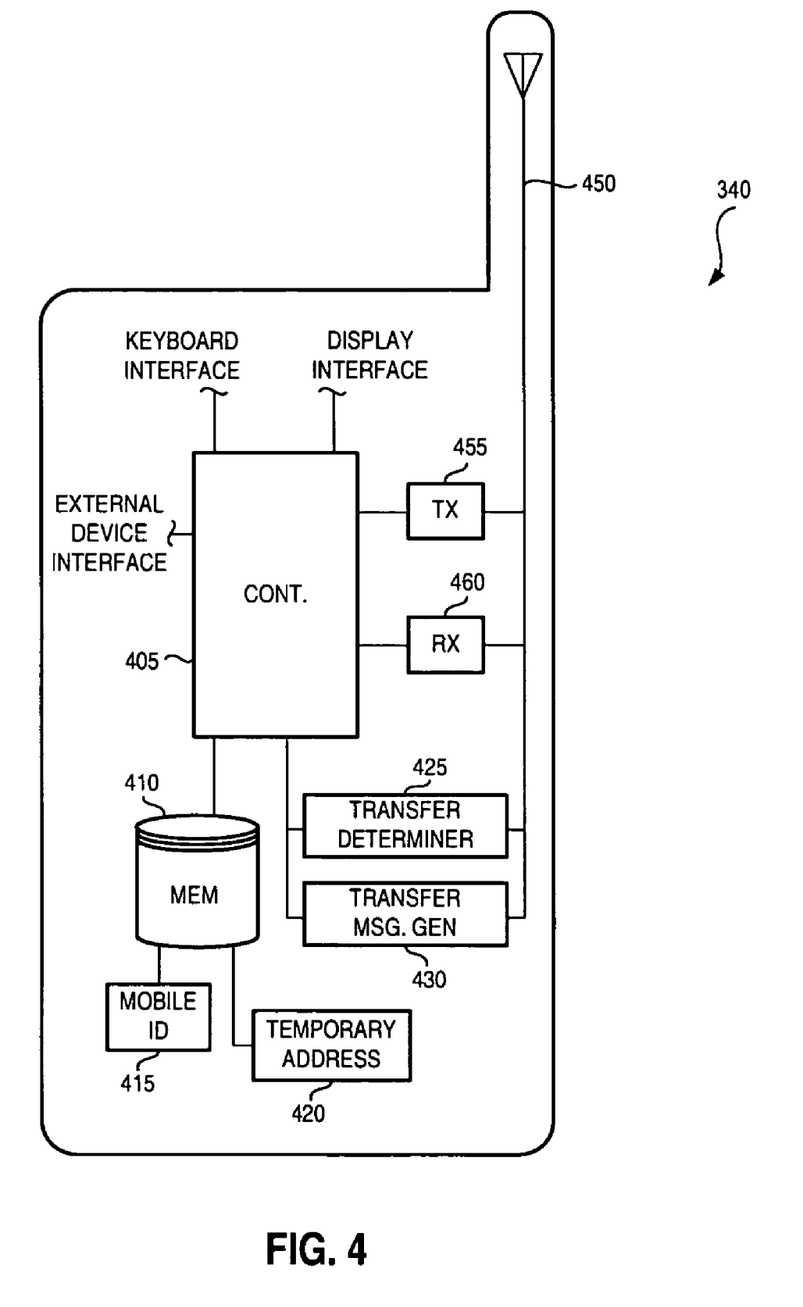
FIG. 4 is a functional block diagram illustrating selected components of a mobile node according to an embodiment of the present invention.

FIG. 4 is a functional block diagram illustrating selected components of the mobile node 340 of FIG. 3 according to an embodiment of the present invention. Mobile node 340, in accordance with this embodiment, includes a transfer determiner 425 that determines when a transfer of communications from one network to another is necessary or desirable. If transfer is determined to be appropriate, transfer message generator 430 generates a message for sending to the session control node 307 to communicate that transfer is imminent.

Transfer determiner 425 and transfer message generator 430 operate under the control of controller 405, which also controls the operation of transmit circuitry 455 and receive circuitry 460, which handle the radio communications of mobile node 340 through antenna 450. Operation of these components is governed by controller 405. A memory 410 is provided for storing data and parameters related to the communications and operation of mobile node 340 including, as explicitly shown in FIG. 4, a mobile ID 415 and a temporary address 420. Note that while the mobile ID identifies the mobile node 340 uniquely, the temporary address, usually a network address such as an IP address, is used for instructing remote devices how to route data so that it can reach mobile node 340 at it current location and network connection.

Controller 405 of mobile node 340 is also coupled to a keyboard interface for permitting user input and a display interface for driving audio or video devices (not shown) on which presentations may be made to the user. An external device interface is also present so that mobile node may be connected to peripheral devises such as full-sized keyboards and displays, printers, CD burners, and so forth. Note these various interfaces are typical but not required, and many variations exist throughout the industry.

In the illustrated embodiment, mobile node 340 is associated with a session control node that is used to facilitate its efficient transfer from one network to another according to the method of the present invention. In FIG. 3, the session control node is associated with WLAN 310, but could be coupled to the mobile node 340 in some other permanent or ad hoc fashion. A session control node according the present invention is illustrated in FIG. 5.

Figure 5:
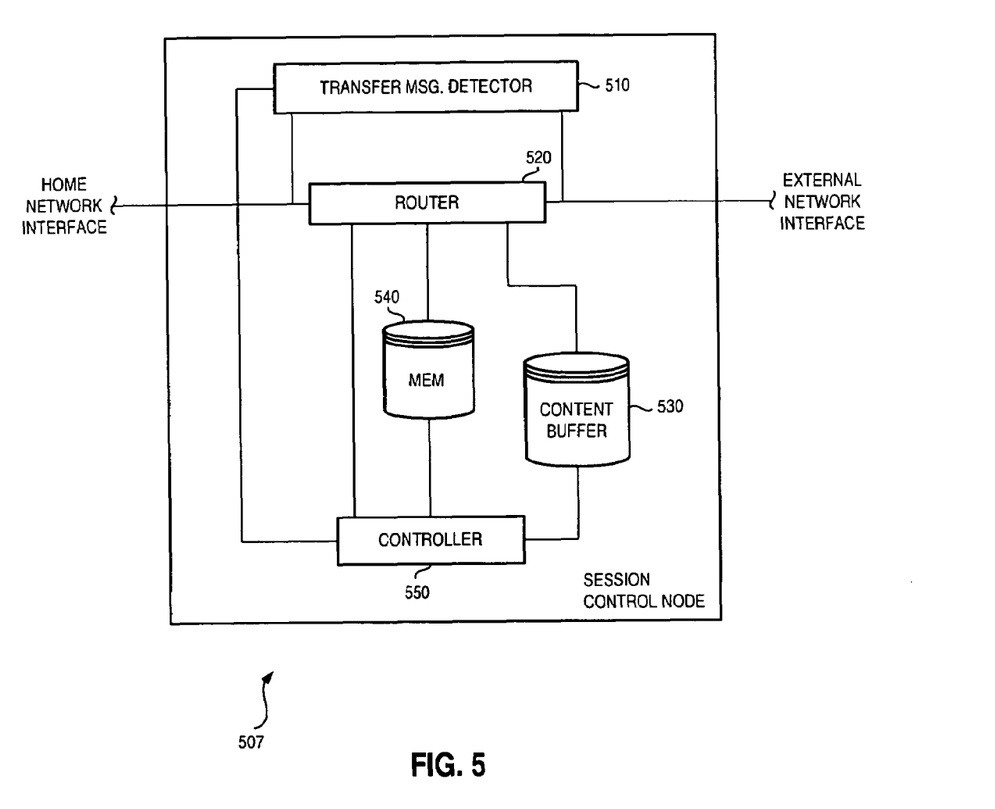
FIG. 5 is a functional block diagram illustrating selected components of a control node according to an embodiment of the present invention.

FIG. 5 is a functional block diagram illustrating selected components of a session control node 507 according to an embodiment of the present invention. The session control node 507 is provided with at least a connection to an external network, for example Internet 350, though which it may communicate with a mobile node such as mobile node 340 shown in FIG. 3, and with any content originating server that mobile node 340 may have access to. In addition, session control node 507 (as shown in FIG. 5) may have a home network interface for communicating with mobile node 340 when it is accessible via its home node. Note that for convenience, session control node 507 is here illustrated as being a separate and distinct unit, but it may also be incorporated into, for example, server 309 or into some other device. It may also, of course, be used to perform additional functions and contain additional components than those illustrated in FIG. 5, so long as it is operable to perform the functions required in applying the present invention.

An internal router 520 not only routes information between network nodes, but also routes information into and out of content buffer 530, where data and other information may be stored during the transfer process according to an embodiment of the present invention. Memory 540 may, among other things, be used to store temporary network addresses and mobile IDs associated with mobile nodes operating through or in connection with session control node 507. Memory 540 may also store subscriber preference information, such as which type of network to select where two or more are available. Memory 540 and content buffer 530 may, of course be incorporated in the same physical memory device, but are separately shown here for purposes of illustration. A handover message detector 10 detects transfer messages from mobile node 340 or other sources indicating that a transfer of networks has been determined to be appropriate. The individual components of session control node 507 are controlled by controller 550.

Figure 6:
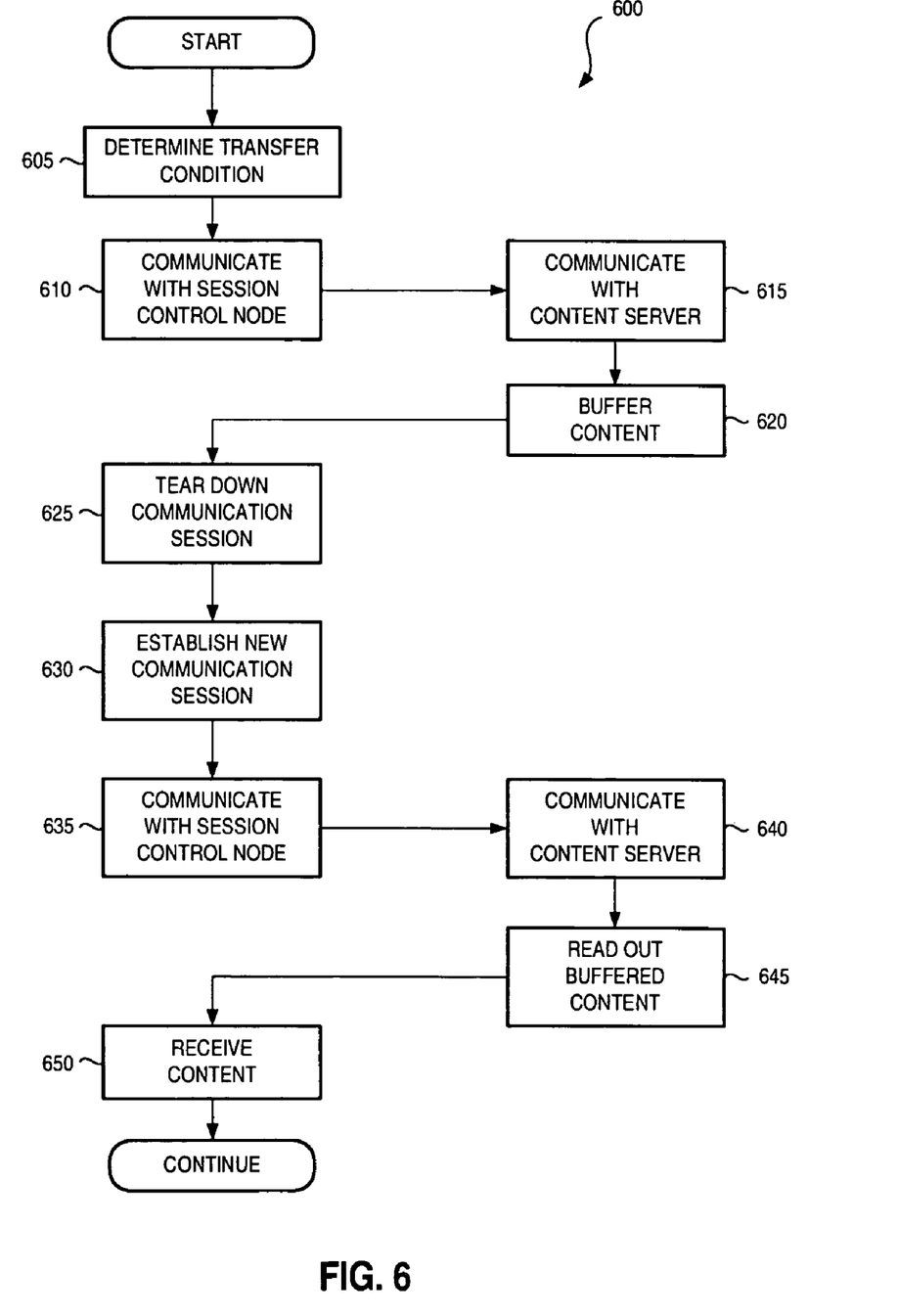
FIG. 6 is a flow diagram illustrating a method of selective network communication according to an embodiment of the present invention.

FIG. 6 is a flow diagram illustrating a method 600 of selective network communication according to an embodiment of the present invention. At start, it is presumed that a mobile node 340 is operating within a network such as ESS 310 shown in FIG. 3, and that a session control node such as node 307 is operable to facilitate a network transfer according to an embodiment of the present invention. The method 600 begins when the mobile node detects that a handover to another network is desirable or necessary (step 605). For purposes of describing the present invention, the distinction between necessary and desirable handover is immaterial. Desirability may be based on cost, traffic level, quality of service (QoS), or simply on the unavailability of one network or the other at any particular time. This may be accomplished, for example, by testing relative signal strengths originating at network access points or BSSs, or based on network instructions, or for some other reason. In some applications, a subscriber (user) choice may have been previously made as to which of two available networks is preferred. As just one example, a subscriber may wish to communicate through an office WLAN during the day, but via a 3G network in the evening when the cellular network rates are lower or the WLAN server is occupied with archival processes.

As mentioned above, since the network coverage areas often overlap, the subscriber may often have a choice. In an alternate embodiment (not shown), the subscriber may be notified that a choice between networks exists and requested to make an election. Subscriber preferences and elections may be stored in the mobile node 340 itself, or in a network node that could initiate handover when a preferred network becomes available. The choice of network may in some cases take into account the type of content being received at the mobile node 340 during the current session or the identity or location of the originating content server.

However the determination to transfer networks is made at step 605, the mobile node 340 then proceeds to communicate to the sessions control node 307 and provide the identity of the new network. (The identity of the previous network may also be provided, though in a typical embodiment it may already be known to the session control node 307.) The communication between the mobile node 340 and the session control node 307 may be accomplished by one message from the mobile node, preferably followed by an acknowledgement from the session control node (individual steps not shown), or it may involve a series of messages that convey all of the necessary information. In one embodiment (not shown) the mobile node also communicates a priority level for the transfer. A high priority level, for example, might be associated with a mobile node that is leaving a first network's coverage area, while a relatively lower level of priority may be ascribed to an optional transfer that is simply done to accommodate user preferences. The session control node 307 then communicates with the content origination server (step 615), if necessary, to ensure that it is receiving the content involved in the current communication session. Note, however, that in a preferred embodiment, the session control node continually receives the content, and either actively routes it to the proper mobile node, or in some configurations simply allows it to be sent undisturbed.

According to the embodiment of FIG. 6, the session control node 307 then begins to buffer the content as it is received (step 620) and preferably notifies the mobile node 340 that it has begun to do so (step not shown). Alternately, mobile node 340 may simply wait a predetermined delay period (after it communicates its intentions to the session control node), or calculate a delay period that is appropriate under the current circumstances. (A longer delay may be required when switching from a WLAN to a 3G network, for example, as opposed to simply switching from one WLAN to another.) In either case, it is preferred but not necessary that the mobile node have confirmation that the session control node is buffering content directed to the mobile node.

At this point the mobile node begins terminating its communication session with the current network (step 625), and establishing a new communication session with the network it is transferring to (step 630). Note that these steps need not be done in this order, in some cases a second session may be established before the first one is terminated. Beginning the new session typically involves dropping a previous (temporary) network address for a new one. The new address being used by mobile node 340 in the new communication session is then communicated to the session control node (step 635), along with any other information necessary to returning to normal communications. Again, this may involve one or a series of messages.

When the new communication session has been established and the mobile node 340 and session control node 307 have communicated the necessary information (steps 630-640), the session control node reads out the buffered content and transmits it to the mobile node (step 645). The mobile node 340 then receives the content in its compete and uninterrupted format, or at least with a reduction in discontinuity, data loss, or inefficient data recovery. (Note, however, that while improved data communication is an expected result of the present invention, it is not a requirement of the present invention that the improvement be achieved or perceived unless explicitly claims as such.)

The mobile node 340 then continues to receive the data or other content in the normal fashion until another network change becomes necessary or desirable. In one embodiment, this normal mode of operation entails continuing to route the information through the session control node, though without buffering or otherwise altering the data. It is simply routed on toward its destination. In another embodiment, a certain amount of data is always buffered by the session control node and then read out for outing to the mobile node, perhaps resulting in some additional delay but not in such a way that would be perceived by the subscriber or result in extraordinary data loss.

Thereby, a subscriber is able to transfer communications during an active communication session with minimal interruption, data loss, and inefficiency due to data recovery.

The previous descriptions are of preferred examples for implementing the invention, and the scope of the invention should not necessarily be limited by this description. The scope of the present invention is defined by the following claims.

What is claimed is:

1. A method for facilitating streaming multimedia communications between a content-originating server and a mobile node in a multi-network communication system, the system having at least a first wireless network and a second wireless network through both of which, data from the content-originating server is sent, said method for facilitating the transfer of streaming multi-media communications data by the mobile node, from the first network to the second network, said method comprising the steps of:

determining at a session control node, from at least one message received from a mobile node, that a network transfer is desirable, said at least one message received from a mobile node indicating at least one of: a priority level for said network transfer and the identity of a network to which a transfer of streaming multi-media communications data is to be made, the session control node being separate and distinct from, but operatively coupled to both the first wireless network and the second wireless network, the content originating server being separate and distinct from but operatively coupled to: the session control node and both the first and second wireless networks;

buffering, in the session control node, subsequent to detection that a network transfer is desirable, streaming multimedia data from the content-originating server that is being transmitted to the mobile node through the first wireless network during a first communication session;

notifying the mobile node that data buffering in the session control node has commenced;

terminating communication of the mobile node with the first network;

establishing communication of the mobile node to the second network; and     transmitting the streaming multimedia data buffered in the session control node to the mobile node through the second network such that the mobile node receives the streaming multimedia from the content-originating server without substantial interruption.

2. The method of claim 1, wherein the step of terminating communication with the first network is performed before the step of establishing communication with the second network.

3. The method of claim 1, wherein the step of establishing communication with the second network comprises the step of assigning a new network address to the mobile node.

4. The method of claim 3, wherein the network address is an IP (Internet Protocol) address.

5. The method of claim 1, wherein the first network is a WLAN (wireless local area network).

6. The method of claim 5, wherein the WLAN forms a home network for the mobile node.

7. The method of claim 5, wherein the session control node is associated with the WLAN.

8. The method of claim 7, wherein the WLAN comprises a server, and wherein the server comprises the session control node.

9. The method of claim 8, wherein the server is coupled to the Internet.

10. The method of claim 1, wherein the step of terminating is performed at a predetermined time following the determining step.

11. The method of claim 10, wherein the predetermined time is a function of the type of network that the second network is.

12. The method of claim 1, wherein the determining step is performed in the mobile phone and further comprising the step of communicating to the session control node that a determination to transfer networks has been made.

13. The method of claim 12, wherein the buffering step is not commenced until after the transfer determination has been communicated to the session control node.

14. The method of claim 1, wherein the second network is a 3G (third generation) cellular network.

15. The method of claim 1, further comprising the step of deleting the buffered data associated with the mobile node.

16. A system for use in transferring streaming multimedia data from a content-originating server to a mobile node operating in a multi-network communication network, said system comprising:

a first wireless communication network through which the mobile node may receive streaming multimedia information during a first communication session;

a second wireless communication network through which the mobile node may receive streaming multimedia information during a second communication session;

a content-originating server that is separate and distinct from, but operatively coupled to both the first wireless communications network and the second wireless communication network; and     a session control node, that is separate and distinct from the content-originating server and which is operatively coupled to the content-originating server and to the first wireless communication network and to the second wireless communication network, said session control node receiving at least one message from mobile nodes that indicate at least one of: a priority level for said network transfer and the identity of a network to which a transfer of streaming multi-media communications data is to be made, said session control node being configured to buffer the streaming multimedia data from the content-originating server, if any, that is transmitted to the mobile node via the first communication network during the first communication session and to read out the buffered streaming multimedia data and transmit it to the mobile node after it has established the second communication session, such that the mobile node receives the streaming multimedia from the content-originating server without substantial interruption.

17. The system of claim 16, wherein the session control node forms a part of the first communication network.

18. A session control node for facilitating the transfer of streaming multimedia data sent from a content-originating server to a mobile node from a first wireless network to a second wireless network, said session control node being separate and distinct from the content-originating server, which is also separate and distinct from the first and second wireless networks, the session control node also being separate and distinct from the first and second wireless networks, the session control node comprising:

a detector for determining from at least one message received from a mobile node that a network transfer is desirable, said at least one message received from a mobile node indicating at least one of: a priority level for said network transfer and the identity of a network to which a transfer of streaming multi-media communications data is to be made;

a controller, operatively coupled to the detector;

a buffer, operatively coupled to the controller, for buffering streaming multimedia data from the content-originating server, if any, being transmitted to the mobile node via the first wireless network so that streaming multimedia data from the content-originating server can be transmitted to the mobile node following the transfer of communications, without substantial interruption.

19. The session control node of claim 18, wherein the session control node continually buffers streaming multimedia data being transmitted to the mobile node from the content-originating server.

20. The session control node of claim 18, wherein data being transmitted to the mobile node is routed through the session control node but not buffered until the session control node has been notified that a transfer is to be executed.

* * * * *